Nov 24, 1953 S. A. SCHERBATSKOY 2,660,662

SEARCH SIGNAL APPARATUS FOR DETERMINING THE LISTENING HABITS OF WAVE SIGNAL RECEIVER USERS

Filed Oct. 24, 1947 5 Sheets-Sheet 1

INVENTOR.
Serge A. Scherbatskoy
BY Mason & Hyss
Attys.

Nov 24, 1953 S. A. SCHERBATSKOY 2,660,662

SEARCH SIGNAL APPARATUS FOR DETERMINING THE LISTENING HABITS OF WAVE SIGNAL RECEIVER USERS

Filed Oct. 24, 1947

5 Sheets-Sheet 2

INVENTOR.
Serge A. Scherbatskoy
BY Mason & Hayes
Attys

Nov 24, 1953 S. A. SCHERBATSKOY 2,660,662

SEARCH SIGNAL APPARATUS FOR DETERMINING THE LISTENING HABITS OF WAVE SIGNAL RECEIVER USERS

Filed Oct. 24, 1947

5 Sheets-Sheet 3

INVENTOR.
Serge A. Scherbatskoy
BY Mason & Hyss
Attys.

Nov 24, 1953

S. A. SCHERBATSKOY 2,660,662

SEARCH SIGNAL APPARATUS FOR DETERMINING THE LISTENING HABITS OF WAVE SIGNAL RECEIVER USERS

Filed Oct. 24, 1947

5 Sheets-Sheet 4

INVENTOR.

Serge A. Scherbatskoy

BY Mason & Hayes

Attys.

INVENTOR.
Serge A. Scherbatskoy
BY Mason & Wyss
Attys.

Patented Nov. 24, 1953

2,660,662

UNITED STATES PATENT OFFICE 2,660,662

SEARCH SIGNAL APPARATUS FOR DETERMINING THE LISTENING HABITS OF WAVE SIGNAL RECEIVER USERS

Serge A. Scherbatskoy, Tulsa, Okla., assignor to A. C. Nielsen Company, Chicago, Ill., a corporation of Illinois Application October 24, 1947, Serial No. 781,988

26 Claims. (Cl. 250—2)

The present invention relates broadly to a search signal type of device for determining the listening or viewing habits of users of wave signal receivers. More particularly the present invention relates to an improved instrumented method and apparatus for determining the audience popularity rating of different programs transmitted from one or more wave signal transmitters and for gathering other information of great importance in determining the effectiveness of radio advertising. Specifically the present invention is concerned with a search signal type of device for determining the listening habits of users of wave signal receivers including means for generating, at a point preferably remote from the wave signal receiver being monitored or metered, a search signal capable of producing a response in said wave signal receiver when the frequency of the search signal falls within the pass band to which the wave signal receiver is tuned, the time of occurrence of the response during the search signal cycle being indicative of the tuning of the wave signal receiver.

Instrumented methods for determining the listening habits of home radio receiver users generally involve the use of a recording device operating in conjunction with each collaborator receiver used in the sampling system to record the extent of use of the receiver and to record as a function of time the wave signal transmitter to which the receiver is tuned for program reception. The usual device of this character embodies facilities for driving a movable recording element such as a movable paper tape, magnetic tape or wire or other recording tape or medium in a predetermined manner together with translating means for variably positioning suitable recording means such as a stylus or the like relative to the recording element in accordance with changes of the tuning of the wave signal receiver. If the recording element moves at a constant speed or in some determinable relationship with respect to time, the record on the recording element not only provides information as to the particular transmitting station or stations to which the receiver is tuned, but also gives accurate information with reference to the time such receiver is tuned to such various transmitting stations.

In general two different types of instruments have been used to produce a record of the extent of receiver use and the particular transmitters to which the receiver is tuned for program reception during a predetermined calendar period. The first or all mechanical type of device employs a mechanical connection between the control means for operating the resonant frequency varying device (which control means might be the tuning shaft of the ganged condensers of a receiver) and the recording stylus of the recorder. The recording stylus is moved transversely of the recording element in accordance with the angular setting imparted to the condenser tuning shaft whereby a record of the particular tuning condition of the receiver is obtained. If the tape is driven at a constant speed then a record of the tuning condition with respect to time is obtained. The connection between the recording means such as the stylus and the receiver tuning shaft dictates the positioning of the recorder in the receiver cabinet which bars its use in connection with small receivers having limited unoccupied cabinet space.

The second type of such instrument used heretofore might be termed an electro-mechanical device, in that an electro-mechanical translating system is interposed between the high frequency signal channel of the receiver and the station recording stylus, to control the movement of the stylus in its operation to record on a time basis the particular transmitters from which programs are received. Generally such a device requires a connection with the local oscillator of receivers of the superheterodyne type and is not adaptable for use with receivers other than the superheterodyne type. Furthermore this type of device generally requires accurate frequency measuring apparatus to be located at the receiver. Such apparatus generally is bulky in the first place and in the second place is usually quite delicate and consequently should not be subjected to jars or the like which it might receive through movement, for example, of the wave signal receiver when re-arranging the furniture in a particular room where the receiver is located.

It would be desirable to provide apparatus for producing a record of the extent of receiver-use which is applicable to any type of receiver whether of the superheterodyne type or not and which either avoids any connection to the receiver at all or at most makes a simple connection with some circuit such for example as the audio circuit of the receiver, thereby in no way disturbing the high frequency circuits. Furthermore the apparatus at the receiver should not include accurate frequency measuring apparatus and should include only sturdy equipment such as a simple band pass filter or an amplifier which will not be damaged through jarring or rough handling and yet which is of sufficiently small bulk so as to be capable of being disposed within the available space in even very small receiver cabinets. The accurate frequency measuring apparatus on the other hand which may be bulky should be capable of being located at a point remote from the receiver such as the basement or a closet of the home where the receiver is located without requiring any special connections between the precision apparatus and the apparatus associated with the receiver being metered or monitored.

Accordingly, it is an object of the present invention to provide a new and improved apparatus of the type referred to above having all of the advantages enumerated above.

It is another object of the present invention to provide improved apparatus and an improved system of the character described in which the apparatus associated with the receiver being monitored does not include accurate frequency measuring apparatus and is of very small bulk.

It is another object of the present invention to provide new and improved apparatus and an improved system of the character described wherein either no connections with the receiver being monitored are made or at most simple connections with the audio circuit are made without in any way disturbing the high frequency circuits of the wave signal receiver.

Still another object of the present invention is to provide an apparatus which may be employed with any type of wave signal receiver, which is simple and compact so that a recording of the tuning condition of the receiver with respect to time may be made at a point remote from the receiver.

It is another object of the present invention to provide means for generating a variable frequency signal which is receivable by a wave signal receiver for producing a distinctive response therein which response is capable of being measured to produce an indication of the tuning condition of said receiver.

It is a feature of the present invention to provide apparatus for indicating with respect to time the transmitting stations to which a wave signal receiver is tuned which includes means for generating a search signal at a point remote from the receiver which search signal is capable of producing a measurable but inaudible response in said receiver, the time of occurrence of said response with reference to a time base being a measure of the frequency at which the response occurs.

Still another object of the present invention is to provide an apparatus for producing at a point remote from the monitored wave signal receiver a search signal of such spectral composition as to produce a measurable response in said receiver when the search signal frequency falls within the pass band to which said receiver is tuned without producing a disturbing variable pitch heterodyne note.

Further objects and advantages of the present invention will become apparent as the following description proceeds and the features of novelty which characterize the invention will be pointed out with particularity in the claims annexed to and forming a part of this specification.

For a better understanding of the present invention reference may be had to the accompanying drawings in which.

Figure 5A:
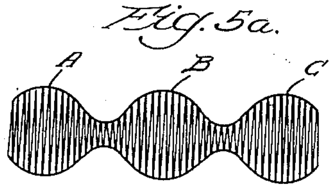
Figure 5B:
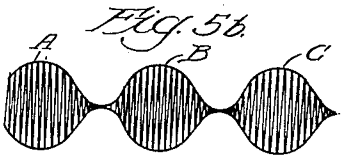
Figure 6:
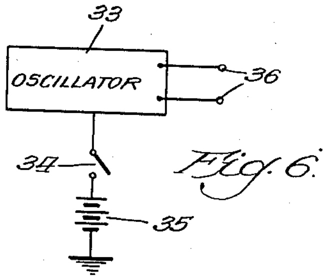
Figure 5C:
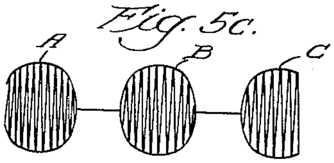
Figure 7:
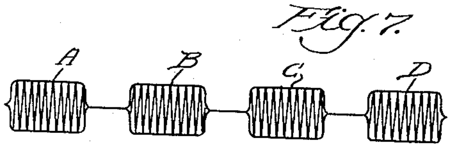
Figure 5D:
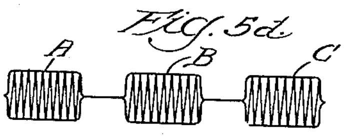
Figure 9A:
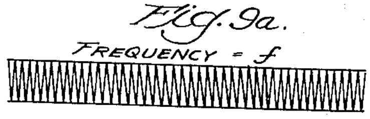
Figure 9B:
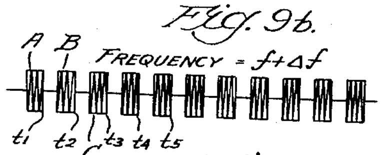
Figures 9C, 10:
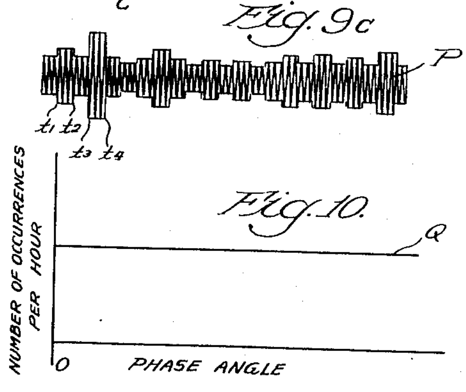
Figure 8D:
Figure 11:
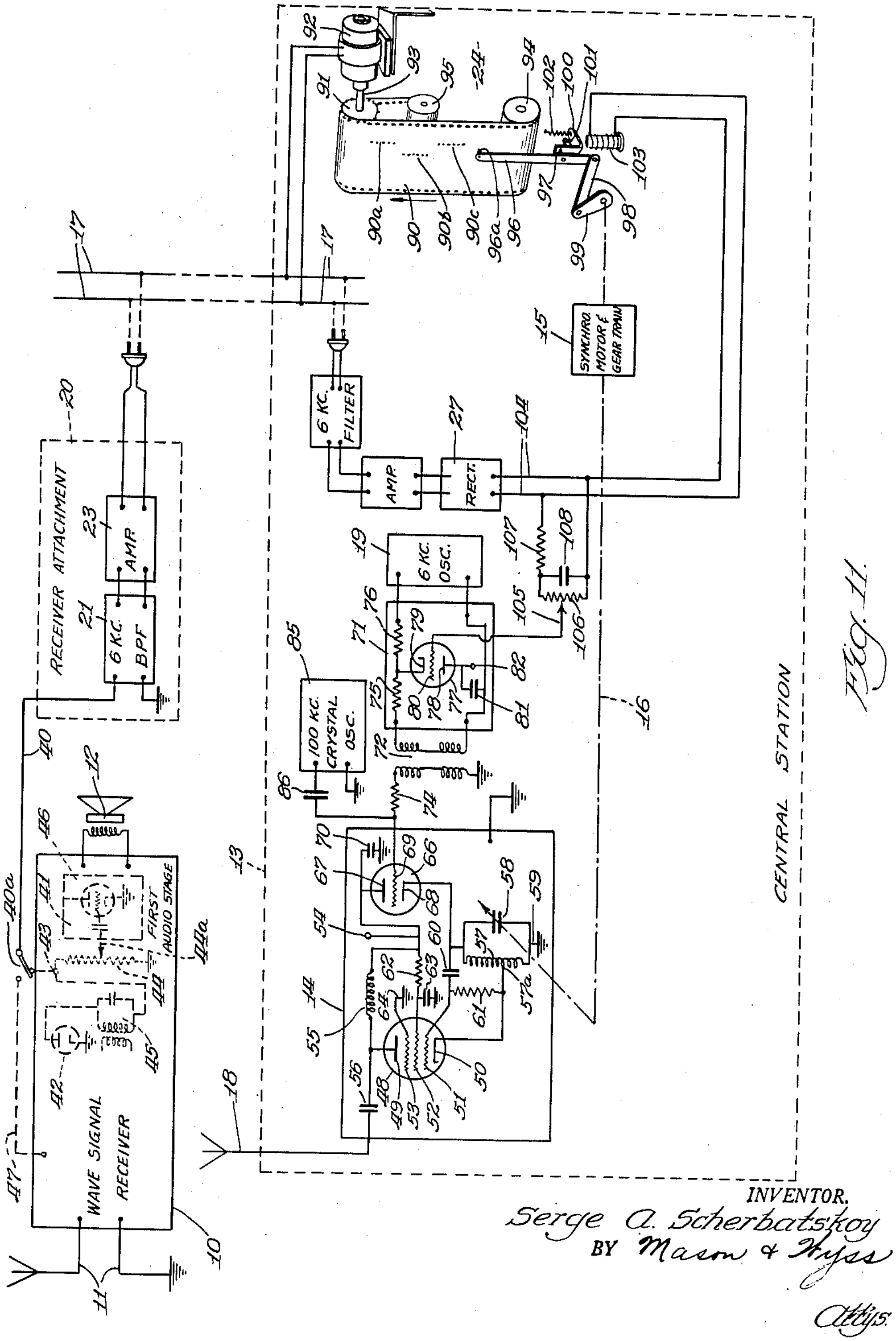
Figure 14:
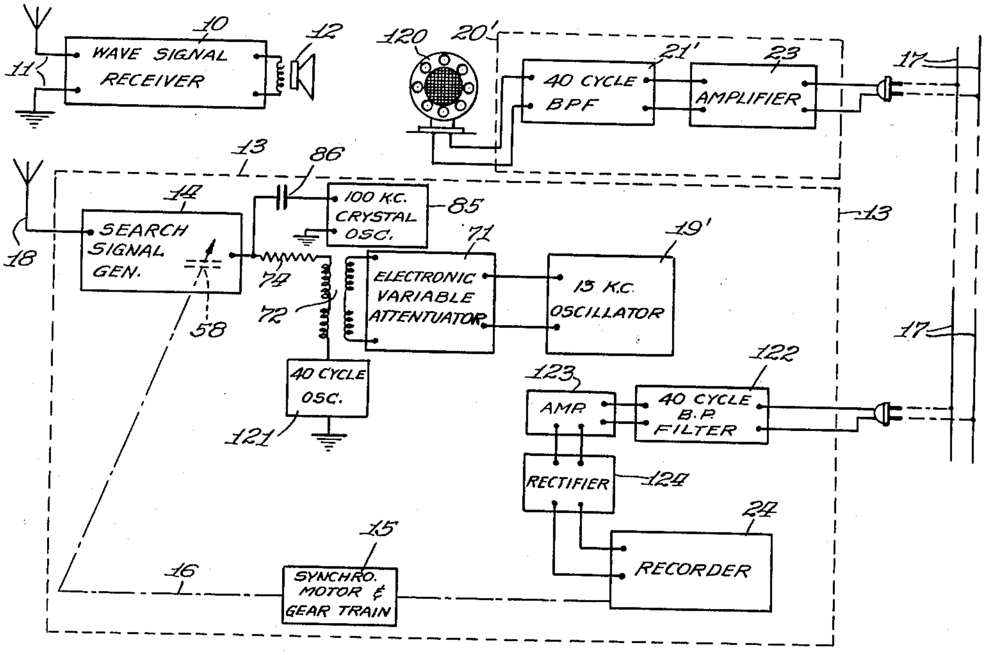
Figures 12, 15:
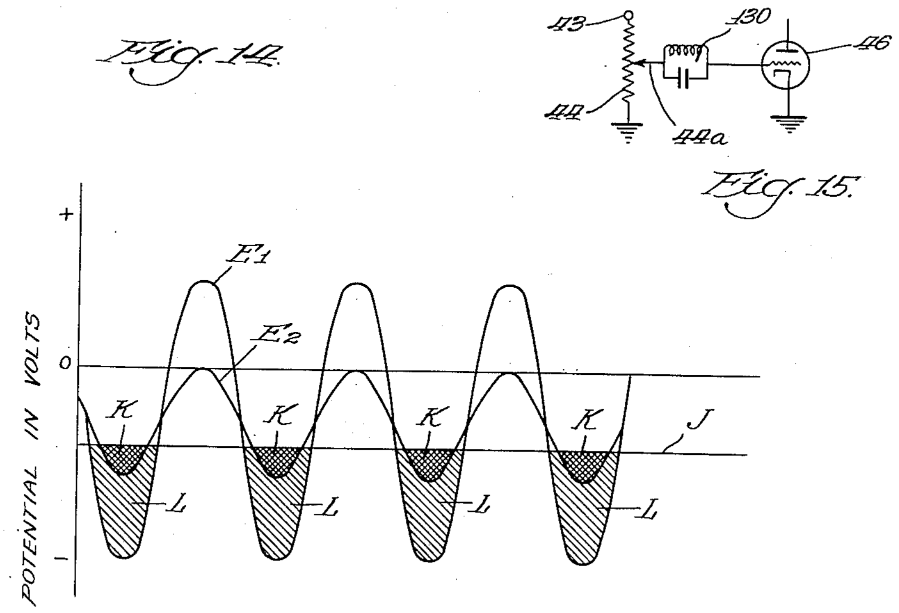
Figure 13:
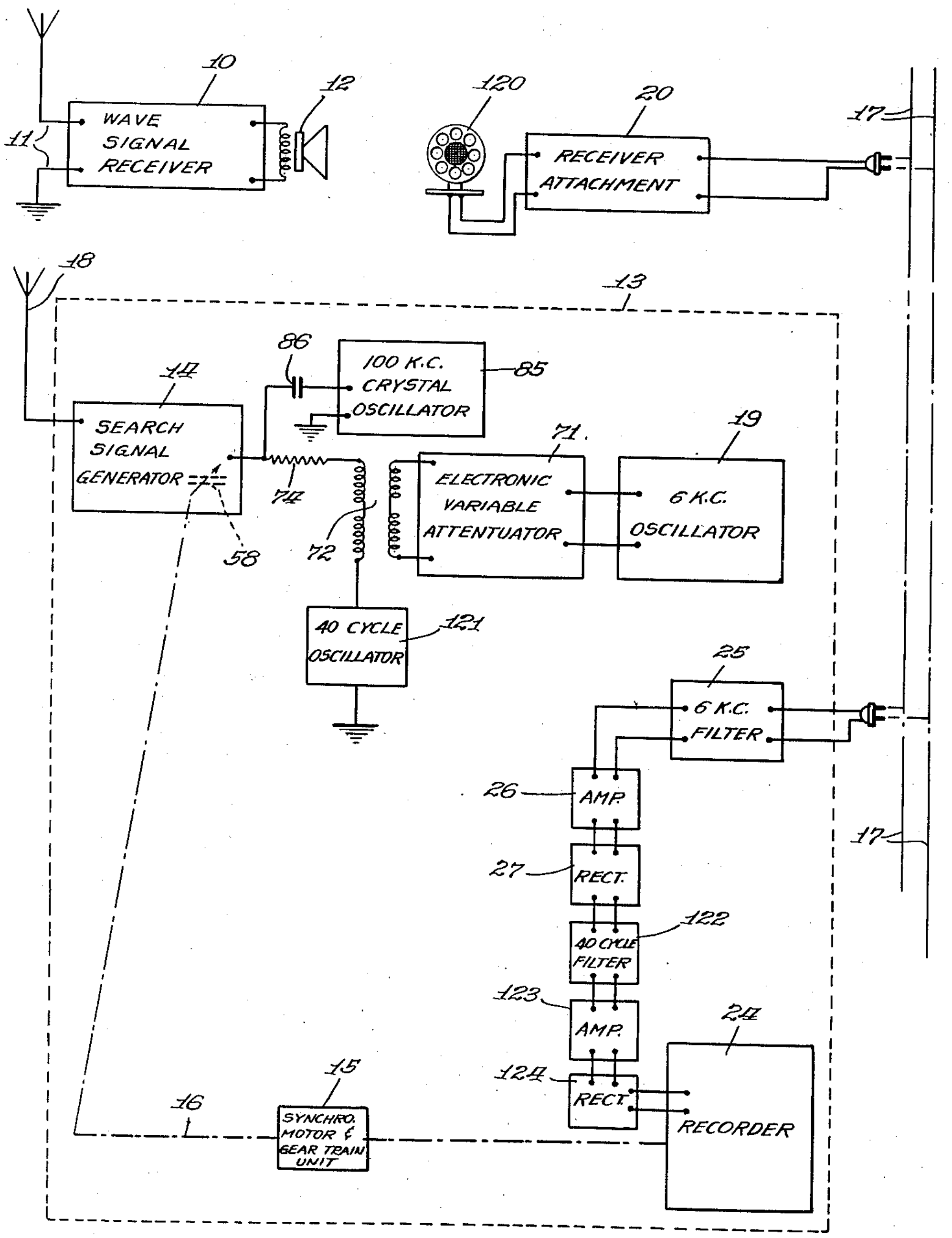

Figs. 5*a*, 5*b*, 5*c*, and 5*d* are curve diagrams of fixed phase modulated signals all having the same carrier frequency but with different degrees or percentages of modulation;

Fig. 6 is a block diagram of a keyed oscillator circuit to aid in understanding how to produce a random phase modulated search signal;

Fig. 7 is a graph similar to Fig. 5*d* but illustrating a random phase modulated signal which could be produced by the keyed oscillator of Fig. 6;

Figs. 8*a*, 8*b*, 8*c* and 8*d* are curve diagrams pictorially illustrating the production of a heterodyne note;

Figs. 9*a*, 9*b*, and 9*c* are curve diagrams similar to curve diagrams 8*a*, 8*b*, and 8*c* and pictorially illustrate that the intermodulation of a random phase modulated signal with another signal, the carrier frequencies of which are only sightly different, will not produce a heterodyne note;

Fig. 10 is a curve diagram to aid in understanding what sort of random phase modulation is required to eliminate the heterodyne note in a search signal type of device;

Fig. 11 is a schematic diagram of a search signal device embodying the present invention employing a random phase modulated search signal;

Fig. 12 is a curve diagram to aid in understandin the operation of the search signal device of Fig. 11;

Fig. 13 is a block diagram similar to that of Fig. 11 illustrating a modification of the present invention;

Fig. 14 is a block diagram similar to the Fig. 13 illustrating still another modification of the present invention; and Fig. 15 is a view of a portion of the wave signal receiver of Fig. 11 illustrating an improved arrangement thereof.

In accordance with the present invention there is provided what might be termed a search signal type of apparatus for metering or monitoring a wave signal receiver to produce a record with respect to time of the tuning condition of such receiver. An externally generated search signal, which may be produced remote from the receiver, is created; which search signal as the name implies searches or scans the frequency spectrum receivable by the wave signal receiver being monitored in accordance with a definite time law. The search signal is designed to have a spectral composition such as to produce a response in the wave signal receiver being metered or monitored when the frequency of the search signal corresponds with the frequency to which the said receiver is tuned and the time of occurrence of the response as referred to the beginning of the searching or scanning period is a measure of the frequency at which the response occurs. The response or index signal produced in the wave signal receiver is preferably referred to as a search tone and is produced when the frequency of the search signal corresponds with the frequency of the tuning of the receiver being monitored or in other words falls within the pass band to which the receiver is tuned. In one type of search signal apparatus a measurable note is produced by the receiver when the frequency of the search signal corresponds to the frequency of the station carrier tuned in by the receiver. Means and apparatus are provided in accordance with the present invention to minimize the production of audible notes and particularly to eliminate any variable pitch heterodyne notes or squeals which might tend to be produced by virtue of intermodulation of the search signal and the station carrier. Such variable pitch heterodyne notes or squeals are more noticeable and objectionable than other types such as shush noise or beats with frequency modulated signals which sound like shush.

Figure 1:
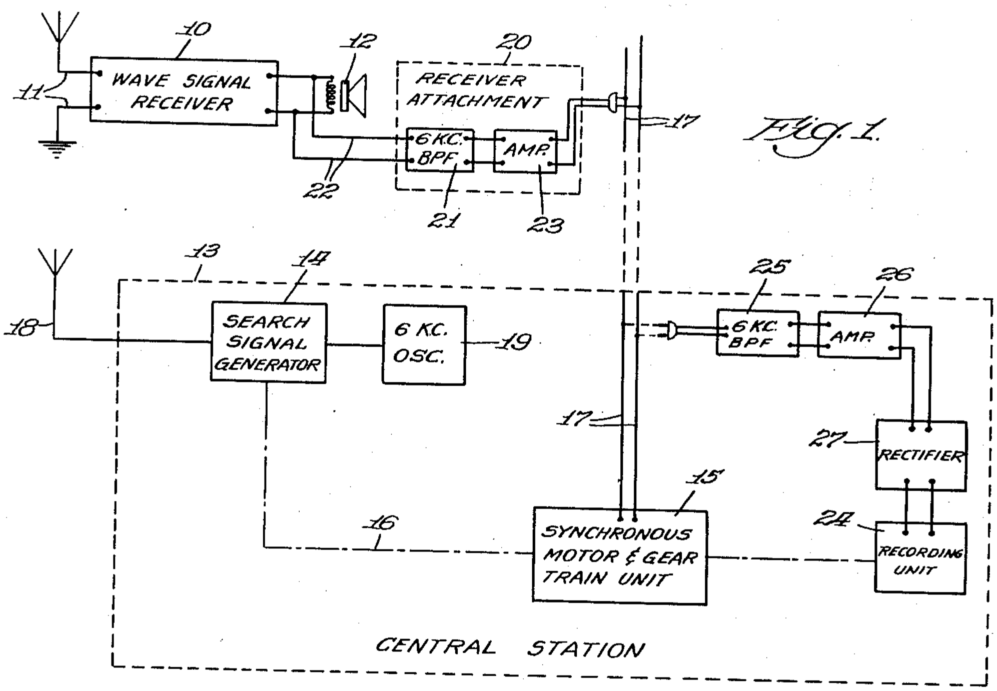
Fig. 1 is a schematic block diagram of a search signal device for monitoring a wave signal receiver illustrating such wave signal receiver and associated apparatus whereby a continuous record of the tuning condition of the wave signal receiver may be obtained.

Referring now to Fig. 1 of the drawings there is illustrated a wave signal receiver generally designated at 10 which comprises an antenna ground circuit 11 and an audio circuit including a loud speaker 12. It is desired to monitor or meter the wave signal receiver 10 so that a record may be obtained at all times of the tuning condition of this receiver. With the present invention the wave signal receiver 10 need not be a superheterodyne receiver as in many of the prior art devices where it was necessary to make connections with the local oscillator of such receivers. Consequently the wave signal receiver 10 may be of the tuned radio frequency type, the upper side band superheterodyne type, the lower side band superheterodyne type, the super-regenerative type, etc.

In accordance with the present invention there is provided at a remote point such as the basement or a closet in the home where the wave signal receiver 10 is located, a search signal generator and recorder unit generally designated at 13 which will be referred to hereinafter as the central station. This unit 13 contains all of the accurate frequency measuring apparatus and no connections with the wave signal receiver 10 are required except the ordinary house wiring circuit, which is used not only as the power source for both the wave signal receiver 10 and the central station 13 but also serves to transmit signals between the receiver or associated apparatus and the central station. As will become apparent from the following description the apparatus associated directly with the receiver 10 is comparatively sturdy apparatus of small bulk such that it may be incorporated within the available cabinet space of small receivers and which is connected at most with a readily available circuit such for example as the audio circuit of the wave signal receiver 10 or in certain cases need have no connection whatever with the receiver.

Figure 2:
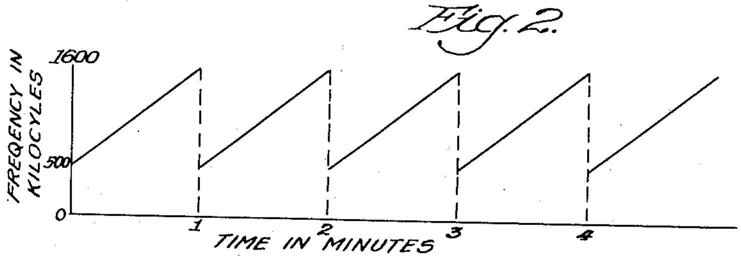
Fig. 2 is a graph to aid in understanding the operation of the search signal generator employed in the apparatus shown in Fig. 1 of the drawings.

The central station unit 13 located at a point remote from the receiver 10 includes a search signal generator 14 capable of producing an output having a periodically variable frequency. As illustrated, this search signal generator is preferably drivingly connected to a synchronous motor or gear train unit 15, by means of a shaft 16, which synchronous motor and gear train unit is suitably energized from a power source such as the 110-volt house wiring circuit indicated at 17. Preferably the search signal generator is operated to produce during a predetermined period, such as during each minute, a search signal output of a varying frequency which variation constitutes scanning the entire frequency spectrum receivable by the monitored receiver. It will be understood that such variation may be a continuously or discontinuously variation of frequency. As is best shown in Fig. 2 of the drawings, the search signal generator 14 may produce a signal whose frequency varies continuously and cyclically with time. In copending Richards application, Serial No. 781,786 filed concurrently herewith and assigned to the same assignee as the present application, there is disclosed an arrangement for producing a search signal which varies discontinuously in frequency. For the standard broadcast band as illustrated in Fig. 2 the frequency of the search signal varies over the frequency range of approximately 500 to 1600 kilocycles during each scanning cycle. Preferably each scanning cycle is one minute long.

It will be apparent that the search signal generator 14 may comprise an oscillator, the output frequency of which is caused to correspond with the frequency illustrated by the graph of Fig. 2 of the drawings which can be accomplished by varying the capacitance of the tank circuit of the oscillator through operation of the one revolution per minute synchronous motor and gear train unit 15. Any suitable link between the search signal generator 14 and the receiver 10 may be employed such, for example as wired wireless over the power circuit, direct transmission line coupling, or other coupling devices involving induction fields, radiation fields, electrostatic fields and the like. As illustrated the search signal generator 14 is connected to a transmitting antenna 18 which transmits the search signal so that it may be received by the antenna ground circuit 11 of the wave signal receiver 10.

For the purpose of producing a measurable and recordable index signal for indicating the tuning condition of the wave signal receiver 10, the spectral composition of the search signal should be such as to produce a response in the frequency selective tuning circuit of the wave signal receiver 10. Essentially there are three requisites for such a search signal: (1) It should have a narrow spectrum so as to occupy a frequency space no larger than that corresponding to one station, (2) when detected in the monitored wave signal receiver detector it must have a characteristic readily distinguishable from speech or music and should preferably be a single frequency component or monochromatic signal which can be picked up by very narrow band pass filters, and (3) it must not produce a disturbing or annoying audible tone or squeal when intermodulating with the station carrier. Hereinafter the terms "monochromatic" or "single component" signal are employed to define a signal having a single frequency component.

It will be apparent that the important requirement of the search tone produced in the receiver is that it be a measurable signal which is either inaudible or substantially inaudible or not annoying. The most desirable signal is one which has a very high ratio of measurability to audibility. A single component signal of a frequency at which both the human ear and the radio loud speaker are comparatively insensitive suggests itself as satisfactory. In view of the fact that most loud speakers for wave signal receivers respond poorly at frequencies slightly above 5,000 cycles a signal higher than that will not be capable of producing a strong response in the loud speaker. Moreover the intermediate frequency amplifier of usual superheterodyne receivers is incapable of passing a very broad range of frequencies which would include sideband frequencies much above 6,000 cycles. On the other hand both the human ear and the radio loud speaker or audio system are most sensitive at frequencies of the order of 3,000 cycles. Accordingly a single component search tone or response in the receiver having a frequency of the order of 5 or 6 kilocycles is preferable since it can be picked up by a very narrow filter. Obviously if an infinitely narrow band pass filter were employed only an infinitesimal amount of music or speech would be picked up, so that substantially infinite amplification of the signal is possible without the music or speech obscuring the search tone or response. Consequently a search tone of very low intensity can be employed, which is substantially inaudible.

To produce such a search tone there is provided an oscillator designated at 19 in the drawings which is connected to the search signal generator so as to modulate or pulse the variable frequency output of the search signal generator. In other words the variable output frequency of the search signal generator is modulated by the oscillator 19. When the frequency of the search signal corresponds with the frequency to which the wave signal receiver 10 is tuned the detector of the wave signal receiver detects the note produced by the oscillator 19 which produces a response in the receiver 10. The time of occurrence of the response or search tone in the wave signal receiver 10, during each scanning cycle of the search signal generator is a measure of the tuning frequency at which the response occurs. For the reason mentioned above the oscillator 19 is illustrated as a 6 kc. oscillator. The intensity of the search signal is controlled so that the 6 kc. search tone is of such low intensity as to be substantially inaudible.

For the purpose of obtaining a recordable index signal representing the response or search tone produced in the wave signal receiver, there is provided at the wave signal receiver 10 a receiver attachment generally indicated at 20 which may be of very small bulk, in some cases no larger than an ordinary cigarette package so as to be readily disposed in the available space within even very small receiver cabinets. As illustrated this receiver attachment 20 includes a band pass filter 21 which is capable of passing substantially only frequencies of 6 kc. whatever the frequency of the oscillator 19 might be, preferably 5 or 6 kc. This band pass filter is illustrated as being connected by suitable conductors 22 with some circuit of the wave signal receiver 10 such for example as the audio circuit thereof. Any suitable connection with the audio circuit for obtaining a signal representative of the search tone when it occurs may be made, substantially the only limitation being that the connection, if made to the audio circuit, be made ahead of the tone control device in the audio circuit for obvious reasons. As will be brought out in detail hereinafter this connection, when made to the audio circuit of the wave signal receiver 10, in no way affects the high frequency circuits nor disturbs them in any manner and the connection is preferably made to a readily available portion of the audio circuit, as for example by merely employing a connection wafer interposed between a suitable tube and its socket. Even the connection with the audio circuit may in many cases be dispensed with and the arrangement disclosed in Fig. 13 of the drawings and described hereinafter may be employed. The output of the band pass filter 21 is connected to an amplifier 23 so as to amplify the search tone which is deliberately maintained at such low intensity as to be substantially inaudible as reproduced by the signal reproducer 12. The amplified search tone is supplied to a suitable link connected to the central station 13. As illustrated this signal link preferably comprises the distribution or house wiring circuit 17 which extends throughout the dwelling in which the wave signal receiver 10 is located.

By virtue of the single component character of the signal produced by the oscillator 19 the search tone can be made substantially inaudible as far as the signal reproducer 12 is concerned through reducing its intensity sufficiently. The band pass filter 21 picks up only a very narrow frequency band of audio signal and effectively picks up substantially no speech or music so that even after high amplification the response or search tone is not obscured by the speech and music, and sufficient amplification to produce a measurable signal is permissible. This measurable response is in the form of a signal which is superimposed on the house wiring circuit and transmitted to the central station 13. At the central station 13 the signal representative of the response produced in the receiver 10 is supplied to a suitable recording unit 24 through a suitable band pass filter 25, an amplifier 26 and a rectifier 27. The particular construction of the recording unit is immaterial as far as the present invention is concerned and it is preferably of the form shown in Fig. 11 of the drawings in which a suitable recording stylus is adapted to move transversely of a movable recording element or tape in a cyclic manner corresponding with the cyclic operation of the search signal generator. Preferably the stylus is moved transversely of the recording element by being drivingly connected to the synchronous motor and gear train unit 15. With this driving relationship the position of the stylus relative to the recording element is related in a definite manner to the cycle of the search signal generator and consequently to the frequency of the transmitting station to which the wave signal receiver 10 is tuned. The stylus is caused to produce a record on the recording element indicative of the response or search tone produced in the receiver 10. Furthermore the recording element is preferably driven by a synchronous motor so as to move at a constant or some other determinable speed whereby the tuning condition of the wave signal receiver 10 with respect to time is continuously recorded.

The operation of the search signal type of device disclosed in Fig. 1 of the drawings will be apparent to those skilled in the art in view of the detailed description included above. The seach signal generator 14 produces a search signal which scans the frequency spectrum once during each minute by virtue of being drivingly connected with the synchronous motor and gear train unit 15. The search signal includes a 6 kc. modulation signal produced by the oscillator 19 so as to be clearly capable of producing a response in the wave signal receiver 10 when the frequency to which the wave signal receiver 10 is tuned corresponds with the frequency of the search signal. This response is detected in the receiver 10 in the form of a 6 kc. search tone which is deliberately maintained at such low intensity as to be substantially inaudible. However this search tone is capable of being picked up by the receiver attachment 20 and transmitted as a signal representative of this search tone to the central station 13 where it is recorded by the recording unit 24. The time of occurrence of the search tone during the cycle of the search signal is indicative of the frequency of the transmitting station to which the wave signal receiver 10 is tuned.

Because of the action of the detector in conventional wave signal receivers a heterodyne or beat note could be produced by virtue of intermodulation between the search signal and the carrier frequency of the station to which the receiver is tuned as the frequency of the search signal approaches that of the station carrier and passes beyond it. With continuous scanning of the frequency spectrum such a heterodyne note occurring once per minute would be very objectionable. In accordance with the present invention there is provided a search signal type of device as described above in which the heterodyne note or squeal is eliminated or rendered sufficiently inaudible as to cause no disturbance.

If the period of the sweeps of the search signal is made very small it will be apparent that although the heterodyne note is not eliminated it occurs so rapidly as to be substantially inaudible. It was found that when the speed with which the frequency of the search signal was changed exceeded one megacycle per second per second the audible heterodyne note or squeal disappeared and was replaced by an audible pulse or thump. The audibility of the thump decreased as the speed of frequency variation increased and when a speed of sweep of 10 megacycles per second per second was reached the thump became appreciably less audible. Unfortunately as the audibility decreased the measurability also decreased. Since the frequency composition of a thump includes a zero frequency component it cannot readily be converted to a supersonic impulse. Also as the sweep of the search signal generator is increased spurious responses are produced so that the high frequency or rapid sweep method of eliminating the heterodyne note in the search signal type of device is not satisfactory where continuous scanning is employed. If one of the lock out arrangements disclosed and claimed in co-pending Scherbatskoy et al. application Serial No. 781,990, filed concurrently herewith and assigned to the same assignee as the present application is employed then the rapid sweep method might be satisfactory for eliminating the heterodyne note.

It is possible to produce a response in a frequency selective circuit so that substantially no heterodyne note and certainly no variable pitch heterodyne note is created when the search signal intermodulates with a station carrier. For example, a narrow band of random noise as for example a thermal noise centered around a radio frequency will cause a response in a selective circuit tuned to the same radio frequency but will not produce any audible heterodyne note because the relative phases of the components are random. Such random noise produces in a signal reproducer such as the loud speaker 12 what is commonly referred to as "shush" noise. This "shush" may be visualized as a tendency to produce a heterodyne note but stopping before the heterodyne note actually is produced. Random noise could be created by a high gain amplifier, a gas tube, or a resistor carrying current coupled to a high gain amplifier. A narrow band of such random noise could readily be obtained by employing a band pass filter. The shush produced by such a scheme is however sufficiently disturbing so that unless the lock out method referred to above is employed the random or thermal noise type of search signal generator is unsatisfactory.

Figure 3:
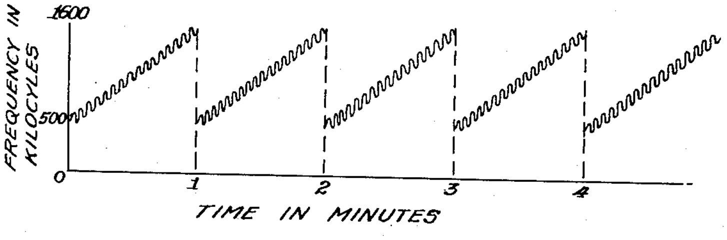
Fig. 3 is a graph somewhat similar to that of Fig. 2 to aid in explaining one method of producing a substantially inaudible search signal which is incapable of producing a disturbing variable pitch heterodyne note or squeal.

The audible heterodyne note can also be eliminated by frequency modulating the output of the search signal generator. Satisfactory operation was obtained by amplitude modulating the search signal at about 10 kc. and frequency modulating at about 6 kc. Such a search signal is illustrated by the graph in Fig. 3 of the drawings. The search tone in the case of a search signal as shown in Fig. 3 would have a frequency equal to 1/P where P is the period of the frequency modulation, and the disturbing shush referred to above is substantially completely eliminated. Unfortunately the spectral composition of the frequency modulated search signal such as is shown in Fig. 3 of the drawings is a very wide band of frequencies and a device using such a search signal would have poor resolution. Means for improving the resolution can be devised but a simpler and preferable arrangement to be described hereinafter is available.

A search signal generator, believed to be the preferred embodiment of the present invention and capable of producing a search signal having what may be termed as random phase modulation, was found to produce no audible heterodyne note when intermodulated with the carrier frequency of the transmitting station to which the monitored or metered receiver was tuned. The search signal from such a search signal generator consists of a pulse modulated sweeping radio frequency. The pulse modulation is of such a character that the phase of the radio frequency signal in one pulse has no definite relationship to the phase of the signal in other pulses. In other words the phase of the carrier frequency within each pulse has a purely arbitrary relationship to the phase of the carrier in a succeeding or preceding pulse.

Figure 4:
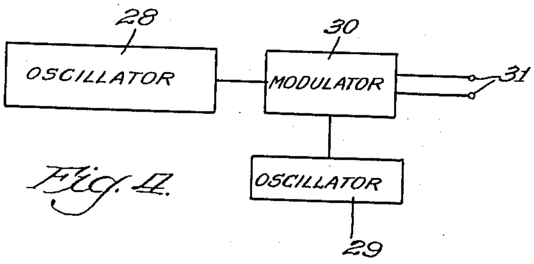
Fig. 4 is a block diagram of a modulator device for producing a modulated signal.

Although the fundamental principle of random phase modulation of the search signal is simple, it can best be understood by reference to Figs. 4 to 9 of the drawings, where a comparison between fixed phase and random phase modulation is made. It will be understood that by means of a pair of oscillators 28 and 29 and a modulator unit 30 as shown in Fig. 4 of the drawings, a modulated radio frequency signal can be obtained at the output 31 of the modulator 30. In Fig. 5*a* there is shown a modulated carrier signal obtainable from the output terminals 31 of the modulator 30 which signal is not completely modulated and which might be referred to as a carrier, the percentage modulation of which is under 100%. As is obvious from Fig. 5*a* of the drawings, the phase of the carrier (with respect to a constant signal of the same frequency) has a fixed value and this is what is meant by "fixed phase" modulation. In Fig. 5*b* a 100% modulated carrier wave is illustrated and again the fixed phase relationship referred to above exists. In both Figs. 5*a* and 5*b* the phase of the voltage bears a fixed relationship to the phase of an imaginary reference signal. In Fig. 5*c* an over-modulated carrier signal is shown and again the signal has a fixed phase. This can be determined by noting that the signal in block B is a continuation of the signal in block A and the signal in block C is a continuation of the signal in block B.

It will be understood that although Figs. 5*a*, 5*b* and 5*c* show modulated signals which are modulated by sinusoidal waves, it is equally possible to modulate such a signal with a rectangular wave. Accordingly, in Fig. 5*d* such a rectangular wave modulated signal is illustrated. The important point to be made however is that with fixed phase modulation the phase of the carrier in pulse A of Fig. 5*d* bears a predetermined relationship to the phase in pulse B or pulse C.

The above description of Figs. 5*a* to 5*d* inclusive is solely for the purpose of better understanding what is meant by random phase modulation to be described hereinafter. In Fig. 6 there is illustrated a keyed oscillator, the oscillator being specifically designated at 33. A suitable keying switch 34 is provided for connecting a source of potential such as the battery 35 with the oscillator whereby a high frequency output may be obtained at the output terminals 36 whenever the switch 34 is closed.

With the oscillator of Fig. 6 it is theoretically possible to produce random phase modulation such as is illustrated by the graph of Fig. 7 which corresponds to the disclosure of Fig. 5*d* except that the phase relationship of the carrier in each of the pulses A, B, C and D is random, that is, there is no definite relationship between the phases of the carrier in the different pulses even though as to the phase of successive cycles within a particular pulse a definite phase relationship exists. To obtain a truly random phase modulation it is necessary to prevent the insertion of any external signal at the instant of initiation of the carrier or oscillating signal. Consequently the arrangement disclosed in Fig. 6 is usually incapable as a practical matter of producing random phase modulation without additional refinements since the closing of the switch 34 would produce an impulse or surge with which the carrier frequency would lock thus preventing random phase modulation. Consequently, whenever there is any vestige of the preceding signal left or whenever the initiating device is likely to produce a click or a surge, random phase modulation is unlikely to occur since the carrier frequency will lock in with the surge. To produce random phase modulation therefore it is necessary to provide means which will in no way tend to affect the random operation thereof or cause a fixed phase relationship to exist. In view of the discussion set forth above random noise such for example as thermal noise suggests itself as a means for initiating random phase modulation of a search signal.

Figure 8A:
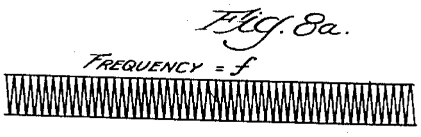
Figures 8B, 8C:
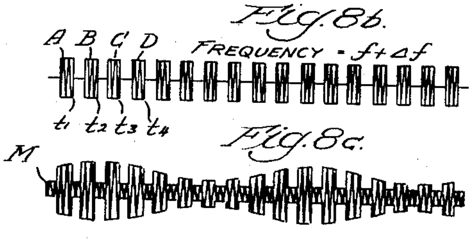

Before discussing a practical way of producing random phase modulation in a search signal type of device it might be desirable to consider why random phase modulation does not produce a variable pitch heterodyne note. In this regard attention is directed to the pictorial representations set forth in Figs. 8*a*, 8*b*, 8*c*, 8*d*, 9*a*, 9*b*, and 9*c* of the drawings. It will be understood that the variable pitch audible heterodyne note occurs when two signals differing only by an audible frequency are intermodulated. Consequently when an ordinary sinusoidal voltage of the frequency $f$ as shown in Fig. 8*a* of the drawings is added to the sinusoidal voltage of $f+\Delta f$, as shown in Fig. 8*b* of the drawings, the sum will vary periodically in amplitude and when detected will cause beats. For the purpose of more clearly explaining the random phase phenomena the signal having a frequency of $(f+\Delta f)$ is illustrated in Fig. 8*b* as comprising a series of pulses, A, B, C, D, etc., or in other words comprising a carrier wave having what was referred to above as fixed phase modulation; i. e., even though the carrier wave is not continuous the fixed phase relationship exists throughout and by knowing what the phase of the carrier wave is at one point the phase at every other point is immediately known. In other words the curve of Fig. 8*b* is substantially the same as the curve of Fig. 8*a* except that the frequency of the carrier is greater by the amount of $\Delta f$ and the carrier is not continuous, but is in a series of successive pulses, the phase of the carrier in each pulse bearing a fixed phase relationship to that of the carrier in the preceding pulse just as if it were continuous as shown in Fig. 8*a*. When the signals shown in Figs. 8*a* and 8*b* having the frequencies $f$ and $(f+\Delta f)$ respectively are superimposed the resultant signal obtained is shown in Fig. 8*c* by the curve M which has an envelope of a frequency $\Delta f$ shown in Fig. 8*d*. Obviously the detection of this signal $\Delta f$, if its frequency is in the audible range, will produce an audible note and as $\Delta f$ changes, the heterodyne squeal will be produced.

The purpose of the random phase modulation of the search signal is to prevent the production of audible heterodyne notes upon intermodulation of the search signal with a carrier which differs by an audible frequency from that of the search signal. Fig. 9*a* illustrates a carrier signal having a frequency $f$ identical with that shown in Fig. 8*a*. Fig. 9*b* shows a modulated signal having the same frequency, e. g., $(f+\Delta f)$ as the signal of Fig. 8*b* but differs from Fig. 8*b* in that the modulation is random phase modulation as contrasted with the fixed phase modulation of Fig. 8*b*. In other words the signal shown in Fig. 9*b* is similar to that shown in Fig. 7 of the drawings where the phase at any point of the carrier in pulse A for example bears no relationship whatever to the phase of the carrier at some point in pulses such as B, C, D, etc., even though as within a particular pulse a predetermined phase relationship exists. Under these conditions the phase angles in Fig. 9*b* at times $t_1$, $t_2$, $t_3$, and $t_4$ of the carrier have the values $\theta_1$, $\theta_2$, $\theta_3$, and $\theta_4$ selected at random. If now the curves of Figs. 9*a* and 9*b* are superimposed in the same manner that the curve of Fig. 8*c* was produced a resultant curve P shown in Fig. 9*c* of the drawings is obtained. Instead of the beat frequency envelope which exists in Fig. 8*c*, an aperiodic function changing discontinuously at the times $t_1$, $t_2$, $t_3$, and $t_4$, etc., results because of the random values of the phase angles $\theta_1$, $\theta_2$, $\theta_3$, and $\theta_4$, etc. If the difference between two successive time intervals such as $t_n-t_{(n-1)}$ is equal to 1/F (where $n$ is equal to 1, 2, 3, etc.), then this regularity will be preserved in the resulting random function and, consequently, the Fourier spectrum of the resultant random function will have a strong component having the frequency F. Thus it is apparent that by intermodulating two carrier signals, one of which is pulsed, the familiar beats are obtained so long as the fixed phase relationship of the pulsed carrier referred to above exists. However, when the fixed phase modulation of the pulsed carrier is changed to random phase modulation such as is shown in Fig. 9*b*, even though the frequency within the pulses of Fig. 9*b* is rigorously the same as that within the pulses in Fig. 8*b*, the familiar heterodyne or beat signal is not obtained due to the random distribution of the phases of the carrier in the successive pulses, and the resultant signal shown in Fig. 9c is obtained.

Unfortunately truly random phase operation is very difficult to obtain since there usually is some external influence present with which a random phase signal would tend to lock, as for example the 60 cycle power lines which usually have an extensive electromagnetic field. It should be understood that the order of occurrence of the phase relationships in a signal having random phase modulation is immaterial so long as all phase relationships are equally represented in a unit of time. What is desired for example is shown by the graph of Fig. 10 where the number of occurrences per hour of the various phase angles which can occur in a random phase modulated signal is plotted against the phase angle of each signal pulse as it occurs. A straight line such as Q is desirable which indicates that all phase angles or phase relationships are equally represented. It is very undesirable for example to have a preferred phase position of a signal which is likely to occur more often than other phase positions, since if the same signal reoccurs sufficiently often with the same phase position in a period of time an audible heterodyne note may result.

In Fig. 11 there is illustrated a search signal type of device such as is shown in Fig. 1 of the drawings employing what is believed to be a form of random phase modulation. The corresponding parts of Fig. 11 are designated by the same reference numerals as in Fig. 1 of the drawings. A wave signal receiver being metered or monitored is illustrated at 10 including the antenna ground circuit 11 and the signal reproducer or loud speaker 12. The receiver attachment 20 is illustrated as being connected by a conductor 40 and the switch 40*a* with an audio stage of the receiver 10 designated at 41. The connection 40 is made to a point ahead of any tone control and preferably ahead of the volume control. As illustrated the wave signal receiver 10 includes a detector 42, the plate circuit of which is connected through the tuned circuit 45 with a terminal 43 which forms what might be termed the top of the volume control resistor 44. The adjustable contact 44*a* of the volume control resistor 44 is connected to the grid of the first audio tube 46 in a conventional manner. The lead 40 from the receiver attachment is preferably connected to the top of the volume control or in other words to the terminal 43 which is readily available in all receivers without in any way interfering with the delicate radio frequency circuits of the receiver. In many receivers the connection 40 can be made directly to a wafer which is inserted between one of the receiver tubes and its base. Such a connection is completed merely by pulling out the tube, placing the wafer on the prongs thereof and re-inserting the tube which is obviously a very simple way of making a connection to the receiver without any soldering operation or the like. Although the connection 40 is preferably made to the terminal 43 it may also be made to some prior stage such as the first detector or the like where the selectivity curve is broader. In Fig. 11 of the drawings the switch 40*a* is illustrated as capable of connecting conductor 40 to some prior stage through the conductor 47.

As in Fig. 1 of the drawings the receiver attachment 20 merely comprises a 6 kc. band pass filter 21 and an amplifier 23. The 6 kc. band pass filter is connected to the receiver 10 by the lead 40 and the output of this band pass filter 21 is connected to the amplifier 23 whose output in turn is superimposed on the house wiring circuit indicated at 17.

The search signal generator 14 comprises an oscillator specifically illustrated as an electron coupled oscillator comprising the electron discharge valve 48 having an anode 49, a cathode 50, a control electrode or grid 51, a screen grid 52 and a suppressor grid 53. The plate circuit of the electron discharge valve 48 is connected to a source 54 of +B potential through a radio frequency choke coil 55. This plate circuit is also coupled to the antenna 18 by a suitable coupling capacitor 56. For the purpose of producing the variable frequency search signal, a tank circuit is provided comprising an inductance 57 and a variable capacitor 58 arranged in parallel. Preferably the capacitance of the capacitor 58 is continuously varied by means of the motor and gear train unit 15 which drive the rotor plates of the capacitor 58 at one revolution per minute. One terminal of the tank circuit is grounded as indicated at 59. The other end or terminal of the tank circuit is connected to the control electrode 51 through a suitable coupling capacitor 60. The cathode 50 is connected to an intermediate point 57*a* on the inductance 57 of the tank circuit. A grid leak resistor 61 is connected across the grid to cathode circuit and the magnitude of the resistance of this resistor and the cathode connection to the inductance 57 are adjusted for proper oscillator action, the resistor 61 having a resistance value high enough so as not to damp the oscillations. The screen grid 52 is connected to the source 54 of +B potential through a suitable voltage dropping resistor 62 and a radio frequency by-pass to ground is provided by the capacitor 63. The suppressor grid 53 on the other hand is grounded as indicated at 64.

In order that the oscillator comprising the electron discharge valve 48 may be modulated, the tank circuit is effectively paralleled by a variable resistor provided by the cathode conductance of an electron discharge valve 66 which is illustrated as a triode having a plate 67, a cathode 68 and a control electrode or grid 69. The electron discharge valve 66 is employed as a variable resistance tube and may preferably be of the type sold on the market as 6J5. When the bias voltage applied to the grid 69 of the electron discharge valve 66 is made less negative, a higher cathode conductance is provided which damps the resonant circuit enough to stop oscillations in the electron discharge valve 48. Conversely as the bias voltage applied to the grid 69 of the electron discharge valve 66 is rendered more negative the cathode conductance of the tube 66 decreases and reaches a value where it no longer damps the oscillator enough to prevent oscillation and consequently oscillator action gradually and normally results. For the purpose of effectively paralleling the tank circuit 57, 58 with the electron discharge valve 66, the cathode 68 is connected to one end of this circuit, while the plate 67 of the valve 66 is by-passed to the grounded end through a capacitor 70. The anode 67 of the electron discharge valve 66 is also connected to the source 54 of +B potential.

To produce a pulsed signal with a 6 kc. amplitude modulation and random carrier phase between pulses capable of producing a search tone in the wave signal receiver 10 the 6 kc. oscillator 19 is illustrated as being connected to the control electrode 69 of the variable resistance tube 66 through an electronic variable attenuator 71, for a purpose to be described hereinafter, and a suitable coupling transformer 72. Preferably a resistor 74 is interposed between the coupling transformer 72 and the control electrode 69 to prevent excessive grid current from flowing. In order to understand how the oscillator of the search signal generator 14 is caused to produce a sort of a pulse modulated signal with the pulses occurring at a frequency of 6 kc. as determined by the oscillator 19, reference may be had to Fig. 12 of the drawings where the curves $E_1$ and $E_2$ represent two different values of the 6 kc. potential applied to the control electrode 69 of the electron discharge valve 66. The curve J of Fig. 12 which is a horizontal line represents the critical grid voltage of the electron discharge valve 66. By that is meant that if the grid voltage of the electron discharge valve 66 is more negative than the voltage represented by the curve J the cathode conductance of the valve 66 is sufficiently small so that oscillations of the electron discharge valve 48 can occur. Whenever the grid voltage of the electron discharge valve 66 is more positive than the voltage represented by the line J in Fig. 12 then the cathode conductance of the tube 66 is large enough to stop oscillations of the electron discharge valve 48. It will be noted therefore that when the 6 kc. voltage $E_2$ is applied to the control electrode 69 the electron discharge valve 48 will produce oscillations only during the intervals of time represented by the double shaded area K in Fig. 12 of the drawings. On the other hand when the 6 kc. voltage has a greater magnitude such as is represented by the curve $E_1$ the oscillator 48 produces oscillations during the time represented by the shaded area L in Fig. 12 of the drawings which includes the area K. With the arrangement disclosed it is apparent that if the magnitude of the 6 kc. voltage applied to the control electrode 69 were infinite then the oscillator 48 would produce oscillations half of the time and would produce no oscillations during the remaining half of the time. On the other hand if the magnitude of the voltage applied to the control electrode 69 were decreased below that represented by the curve $E_2$ in Fig. 12 of the drawings then the oscillator would be inactive for greater periods of time and if the intensity were decreased to a sufficient extent that the 6 kc. voltage never reached a negative value as great as that represented by the curve J no oscillations would ever be produced. It is apparent that the intensity or magnitude of the voltage applied to the grid 69 of the resistance tube 66 may be varied by means of the electronic attenuator 71 to give the desired control of the search signal produced by the search signal generator 14. From the above description it will be apparent that a signal having a wave form represented by Fig. 9*b* of the drawings is produced at the output of the search signal generator 14 which is supplied to the transmitting antenna 18, with the pulses A, B, C, D, etc., of the search signal occurring at a frequency of 6 kc. by virtue of the 6 kc. oscillator 19.

The partcular construction of the electronic variable attenuator 71 forms no part of the present invention and is illustrated as comprising means for by-passing a portion of the 6 kc. signal from the oscillator 19, the attenuation caused thereby being determined by the proportion of the signal which is by-passed with reference to the coupling transformer 72. As illustrated the variable electronic attenuator 71 comprises a pair of resistors 75 and 76 serially arranged in one leg of the circuit between the oscillator 19 and the coupling transformer 72. A suitable electron discharge valve 77 is connected across the two legs of the circuit extending through the electronic attenuator 71. This electron discharge valve 77 is illustrated as comprising an anode 78, a cathode 79 and a control electrode 80. The plate circuit of the electron discharge valve is connected across the two legs of the circuit in series with a suitable coupling capacitor 81, the cathode 79 being connected to the common terminal of the serially arranged resistors 75 and 76. A source 82 of +B potential for the plate circuit of the electron discharge valve 77 is provided. It will be apparent that if the grid potential of the electron discharge valve 77 is varied in a suitable manner the attenuation of the variable electronic attenuator 71 may be controlled in any desired manner whereby the magnitude of the grid potential applied to the electron discharge valve 66 from the 6 kc. oscillator 19 may be varied, two possible voltage values being represented by the curves $E_1$ and $E_2$ of Fig. 12 of the drawings.

For the purpose of avoiding a heterodyne note, as has been brought out in detail in connection with the description of Figs. 9*a*, 9*b*, and 9*c* of the drawings, the phase relationship of the oscillations within the various pulses of the search signal with reference to other pulses should be a purely random relationship. It was found, however, that it was not essential that the time of occurrence of particular phase relationships be random, but merely that no particular phase relationship occur any more often than any other phase relationship; in other words, that no particular phase relationship be given preference. As was mentioned above, there is a strong tendency for oscillations to lock in with that of an external frequency and in accordance with the present invention an external source of frequency generally designated at 85 in the drawings is provided. This oscillator 85 is preferally a relatively weak source of oscillations which are supplied through a coupling capacitor 86 to the control electrode 69 of the variable resistance tube 66. It was found that when this external source of oscillations 85 produced a signal having a frequency exactly equal to a multiple of 10 kc., as for example a frequency of 100 kc., no heterodyne note or unsatisfactory "shush" noise was obtained upon operation of the search signal type device in the broadcast band. To maintain an accurate frequency output of 100 kc. the oscillator 85 is preferably a crystal oscillator.

It is believed that the following explanation of why the employment of a 100 kc. oscillator such as 85 in the manner described produces a type of random phase modulated search signal which causes no variable pitch heterodyne note in the wave signal receiver 10 is plausible. It should be understood, however, that this explanation or theory may not be the correct theory and some other explanation for the operation may be the proper explanation. It is furthermore intended that this theory is expounded only by way of explanation and not by way of limitation since satisfactory operation was obtained with the arrangement described. It will be understood that in the standard American broadcast band the transmitting frequencies allocated to broadcasting stations are all exact multiples of ten kc. If the external frequency with which the phase of the search signal tends to lock is also an exact multiple of 10 kc. then at the instant that the two frequencies lock in step there is a momentary heterodyne note of zero frequency which is inaudible. Consequently by virtue of the fact that the oscillator 85 produces a signal having a frequency exactly equal to 100 kc., there is a tendency each time a pulse such as A, B or C of the search signal shown in Figs. 7 and 9b of the drawings is produced for the phase of the high frequency oscillations in the pulse to lock into step with the 100 kc. oscillations or another multiple of 10 kc. Due to the fact that the oscillations produced by the tube 48 vary in frequency within the range of 500 to 1600 kc. during each revolution of the shaft 16 which causes movement of the rotor plates of the condenser 58 at one revolution per minute, the natural frequency of the tank circuit is substantially different than 100 kc. so that the oscillations which tend to lock in with the 100 kc. oscillations break out of step in a random fashion with reference to successive pulses to provide a random phase modulation which does not produce either a variable pitch heterodyne note or an undesirable shush noise. To understand this better consider for example that the wave signal receiver 10 is tuned to a transmitter whose transmitting frequency is 1,000 kc. By virtue of the operation of the synchronous motor and gear train unit 15 the frequency of the oscillations produced by the search signal generator 14 continually vary during each scanning cycle. Suppose that at the instant under consideration the natural frequency of the tank circuit comprising the inductance 57 and the capacitor 58 is 1000.01 kc. If the voltage applied to the control electrode 69 of the tube 66 becomes more negative so that it reaches the critical voltage represented by the curve J in Fig. 12 of the drawings, the oscillator 48 tends to begin oscillating momentarily locking in step with the 100 kc. oscillations at a frequency of 1000 kc. which is another multiple of 10 kc. However, due to the weakness of the 100 kc. oscillations the frequency of the oscillator 48 which at that instant, let us say, is 1000.01 cycles per second drifts out of step with a particular phase relationship. During the next cycle of the 6 kc. oscillator 19 the frequency of the oscillator 48 is increased let us say to 1000.04 kc. Again the phase of the oscillations produced by the tube 48 initially tends to lock in phase with a frequency of 1000 kc. and then drifts out of steps somewhat sooner than in the preceding cycle since the frequency difference is greater. Consequently the phase of the oscillations produced by the tube 48 in the second pulse under consideration is advanced and in succeeding cycles the phases again differ so that a form of random phase modulation is obtained with no particular phase relationship between the particular pulses being given preference.

It will be understood that random phase modulation of the search signal could be produced by employing random noise such as thermal noise to initiate oscillations of the oscillator tube 48 during each portion of the cycle of the 6 kc. oscillator that such oscillations are permitted to be produced. It was found that instead of employing the 100 kc. oscillator 85 satisfactory operation was obtained by supplying to the control electrode 69 of the variable resistance tube 66 an external signal picked up from various radio transmitting stations tuned in by the wave signal receiver 10. This fits in with the theory expounded above since such an external signal is in effect similar to the 100 kc. signal since the transmitting frequency of all American radio stations within the standard broadcast band are multiples of 10 kc.

The remainder of the apparatus of the central station 13 is substantially identical with that disclosed in Fig. 1 of the drawings. The recorder 24 has been illustrated as of a specific type by way of example only. As illustrated this recorder comprises a movable recording element 90 which is illustrated as a record tape having sprocket holes adapted to be engaged by a suitable sprocket 91 driven by a synchronous motor and gear train unit 92 through a shaft 93. The synchronous motor unit 92 is preferably energized from the house wiring circuit 17 as illustrated. The recorder 24 also includes a tape supply spool 94 and a take up spool 95 together with suitable means for maintaining the tape in a taut condition. The means for producing a record on the tape is illustrated as comprising a stylus 96 which is supported for arcuate movement on a pivot 97 so that the inscribing portion 96a thereof is adapted to move transversely of the tape 90. The stylus 96 is connected by a suitable link 98 and a crank 99 with the synchronous motor and gear train unit 15 which also rotates the rotor plates of the capacitor 58 in the search signal generator 14. It will be apparent that the position transversely of the recording element 90 of the inscribing portion 96a of the stylus 96 will correspond to a particular position of the rotor plates of the variable condenser 58 or in other words to a particular frequency of the search signal produced by the generator 14.

For the purpose of producing the desired trace on the recording element 90 the stylus pivot 97 is supported from a movable carriage 100 mounted for limited movement about a pivot 101. A suitable spring 102 biases the carriage 100 in such a manner that the inscribing point 96a of the stylus 96 is normally not in trace producing engagement with the recording element 90. A portion of the carriage 100 forms the armature of an electromagnet comprising a coil 103 which is connected to the output of the rectifier 27 as by the conductors 104. Whenever the search signal generator produces a signal which creates a response and consequently a search tone in the wave signal receiver 10 the search tone is filtered and amplified by the receiver attachment 20 and again filtered and amplified and finally rectified in the central station 13 so as to energize the winding 103 and cause the stylus 96 to engage the movable recording element 90. Since the response only occurs when the frequency of the search signal falls within the pass band to which the wave signal receiver 10 is tuned, traces such as are indicated at 90a, 90b, and 90c in the form of a series of dots or pecks, one per minute, will be produced on the movable record tape 90 when the wave signal receiver 10 is tuned in a particular manner and the position of such traces transversely of the record tape 90 will be indicative of the particular tuning conditions of the wave signal receiver 10.

It will be apparent to those skilled in the art that the rectified output of the rectifier 27 should be just strong enough to energize the winding 103 and cause the stylus 96 to engage the recording element 90 upon the occurrence of a response in the wave signal receiver 10 whereby the ratio of measurability to audibility may be maintained at a maximum. Due to the presence of automatic gain control in most wave signal receivers the wave signal receiver during the evening is very insensitive and a stronger search signal is required to produce a response than in the day time when the automatic volume control of the receiver makes the receiver much more sensitive. For more satisfactory operation, therefore, it is desirable to provide means responsive to the output of the rectifier 27, such for example, as the voltage supplied to the stylus winding 103, for varying the intensity of the search signal produced by the search signal generator 14 as by controlling the effective operating time of the oscillator comprising the electron discharge valve 48. Accordingly there is provided a form of automatic volume control wherein the control electrode 80 of the electron discharge valve 77 of the electronic variable attenuator 71 is connected to a variable tap 105 of a voltage divider 106 which is connected across the conductors 104, comprising the output circuit of the rectifier 27, in series with a resistor 107. A suitable capacitor 108 is connected across the voltage divider 106. The capacitor 108 and the resistor 107 are chosen so as to provide a time constant such that the operation of the automatic volume control arrangement is correlated with that of the recorder 24. The voltage divider 106 provides the means for making the initial adjustment of the electronic variable attenuator 71. In view of the detailed description included above and the curve diagrams of Fig. 12 of the drawings the operation of the automatic volume control arrangement for the search signal generator 14 will be apparent. This automatic volume control action is obtained by effectively varying the intensity of the 6 kc. signal from the oscillator 19 as applied to the control electrode 69 of the variable resistor tube 66. It will be apparent that instead of varying the intensity of this signal which is an alternating current signal the same effect might be obtained by varying a direct current bias applied to the tube 77. Although the variable electronic attenuator 71 is illustrated as being interposed between the 6 kc. oscillator and the search signal generator 14 it will be apparent that a radio frequency variable attenuator might be employed in the antenna circuit of the search signal generator 14 to provide a similar automatic volume control.

In view of the detailed description included above the operation of the random phase search signal type of device illustrated in Fig. 11 of the drawings will be apparent to those skilled in the art, and no further discussion thereof will be included. Briefly the search signal generator 14 and the associated oscillator 19 produce an output frequency which has a wave form somewhat similar to that shown in Figs. 7 and 9b of the drawings with the phase relationship of the oscillations in the various pulses such as A, B, C, D, etc., varying in a random fashion and having no fixed relationship with respect to each other. Consequently a search signal having a 6 kc. random phase modulation component is produced with the result that no variable pitch heterodyne note or disturbing shush is created in the wave signal receiver 10 as the frequency of the search signal approaches that of the transmitter to which the wave signal receiver 10 is tuned. When the frequency of the search signal coincides with that of the transmitter tuned in by the wave signal receiver 10 a response in the form of a search tone is produced in the wave signal receiver 10 which search tone has a frequency which is monochromatic and equal to that of the oscillator 19, preferably 5 or 6 kc. This search tone or 6 kc. signal appearing in the audio circuit of the receiver 10 is supplied to the receiver attachment 20, and from there to the house wiring circuit 17 which leads to the central station 13. The search tone or response as supplied to the recorder 24 causes the stylus 96 to produce a trace on the recording element 90. The instant of occurrence during the scanning cycle of the search tone governs the position transversely of the tape or recording element 90 of the stylus 96 when the trace is produced. Due to the fact that a monochromatic or single component search tone is employed which can be highly filtered and amplified the intensity thereof in the receiver is maintained low enough so as to be inaudible. By employing the 100 kc. crystal oscillator 85 a type of random phase modulation, which is truly random in the sense that all of the phase relationships possible are equally represented during a unit of time, is produced so that no variable pitch heterodyne note nor disturbing "shush" noise is created in the wave signal receiver 10.

Although in the arrangements described above a direct connection between the receiver attachment 20 and a circuit such for example as the audio circuit of the wave signal receiver 10 has been described it is possible with the present invention to eliminate completely all connections with the audio circuits as well as the radio frequency or other circuits of the wave signal receiver 10. In Figs. 13 and 14 there are illustrated search signal type devices, with the corresponding parts designated by the same reference numerals as in the preceding figures, in which the input to the receiver attachment is connected to a microphone 120 which may be placed in the room with the wave signal receiver at a predetermined distance from the signal reproducer or loud speaker 12. This arrangement has the advantage that no connection whatever is made with either the audio or high frequency circuits of the receiver 10.

It should be understood that the search signal devices described above are applicable for monitoring or metering frequency modulation wave signal receivers as well as amplitude modulation wave signal receivers, although the principle of operation is slightly different as far as frequency modulation receivers are concerned. It is believed that in all of the various types of search signals described above that there are included frequency modulation components. For example, in the rapid sweep method described above, it is obvious that a frequency modulation component is present in the search signal since the search signal is changing in frequency with great speed. Also in the search signal disclosed in the curve of Fig. 3 of the drawings there is clearly a frequency modulation component present since the method specifically comprises frequency modulating the search signal. As far as the random phase modulation search signal is concerned, it has been determined that the modulating system for producing a random phase modulated search signal as described above causes substantial components of a frequency modulated signal to be included. Furthermore at the initiation of each pulse of the search signal the oscillations or carrier frequency thereof change in frequency very rapidly. As was mentioned above when a search signal type of device is employed to monitor an amplitude modulation wave signal receiver the problem of eliminating the heterodyne note between the station carrier and the search signal exists which is satisfactorily solved by the methods described above. With a frequency modulation wave signal receiver, on the other hand, a heterodyne note cannot be produced while modulation is present. However, it is necessary that the search signal supplied to a frequency modulation receiver has properties capable of being passed by the discriminator or ratio detector so that a response in the audio circuit is produced which can be measured and recorded as described above.

For the purpose of improving the measurability to audibility ratio of the search signal type of device shown in Fig. 11 of the drawings the search signal is deliberately made as weak as possible so that the response produced in the receiver 10 is inaudible. This response is filtered and amplified both in the receiver attachment 20 and the central station 13. It will be understood that there is a limit to the amount of amplification possible since the filtering of the signal representative of the search tone will also include some speech or music. With the arrangement described above it is possible in rare cases, for example, for an instrument such as the triangle in an orchestra to generate a note having a frequency component exactly equal to 6 kc. or to the frequency of the oscillator 19. Every time such a note is produced by the triangle a response is produced in the wave signal receiver which is not distinguishable from the search tone. To prevent false operation it is necessary to make the intensity of the search tone sufficiently strong in the receiver so as to override any interference caused by a musical note or signal which is similar to the search tone. This can be avoided in accordance with the present invention by what may be referred to as a "doubly modulated" search signal. A preferred arrangement for producing a "doubly modulated" search signal is illustrated in Fig. 13 of the drawings where the corresponding parts are designated by the same reference numerals as in the preceding figures. Without considering the provision of the microphone 120 mentioned above the arrangement shown in Fig. 13 of the drawings is substantially identical with that of Fig. 11 as far as the receiver attachment 20 is concerned and the central station 13 differs only in that a few additional elements are provided. As illustrated in Fig. 13 of the drawings a low frequency oscillator 121 is provided which is interposed between ground and one terminal of the coupling transformer 72. This low frequency oscillator is preferably capable of producing a sub-audible tone and any suitable low frequency such as 20, 30 or 40 cycles is satisfactory. As specifically illustrated in Fig. 13, the oscillator 121 is a 40 cycle oscillator although it should be understood that it might equally well be a 20-cycle or a 30-cycle oscillator. With this arrangement it is apparent that the control electrode 69 of the variable resistance tube 68 is supplied not only with the 6 kc. oscillations from the oscillator 19 but also with the relatively slow 40 cycle oscillations from the oscillator 121. The search signal therefore differs from that illustrated in Figs. 7 and 9b of the drawings in that the pulses such as A, B, C, D, etc., are cut off entirely during alternate half cycles of the 40-cycle oscillations. It will furthermore be apparent that the search tone or response produced in the wave signal receiver instead of being a 6 kc. response as in Fig. 11 of the drawings is a 6 kc. response modulated with a 40-cycle modulation component. This modulated 6 kc. signal is picked up by a microphone 120 and transmitted by the receiver attachment 20 to the house wiring circuit 17 where it is applied to the 6 kc. filter 25, the amplifier 26 and the rectifier 27 which detects the 40 cycle oscillations. The output of the rectifier 27 is successively applied to a 40-cycle filter designated at 122, an amplifier 123, and a rectifier 124. The output of the rectifier 124, on the other hand, is supplied to the winding 103 of the recorder 24 so as to produce the same operation of the recorder 24 described in detail in connection with the description of Fig. 11 of the drawings. It will be apparent that with this arrangement a pure 6 kc. signal cannot be supplied to the recorder 24 since it would be blocked by the 40-cycle filter 122. The only signal which can be supplied to the recorder 24 is one having a frequency of 6 kc. with a 40-cycle modulation component. If the occurrence of a pure 6 kc. note which would cause false operation of the recorder 24 in Fig. 11 of the drawings is rare as was pointed out above, then the occurrence of a 6 kc. signal modulated with exactly 40 cycles will be considerably rarer so that with so-called "double modulation" of the search signal the possibility of a false operation is substantially eliminated. It should be understood that this concept of "double modulation" can be carried farther so as to produce a very unusual search signal capable of producing such an unusual search tone that never could be confused with any other signal received by the wave signal receiver being monitored, such as 10. Consequently it is possible to make the search tone of such low intensity as to be inaudible at all times since substantially infinite amplification thereof is possible in the receiver attachment and the recorder without confusion with music or speech if the search tone is sufficiently unique and different from anything likely to occur.

In Fig. 14 of the drawings there is illustrated a modified search signal type of device employing another form of "double modulation" of the search signal. The corresponding parts of Fig. 14 are designated by the same reference numerals as in Fig. 13. The 6 kc. oscillator 19 of Fig. 13 is replaced in Fig. 14 by an oscillator having a frequency which is supersonic as far as the human ear is concerned. As illustrated in Fig. 14 such an oscillator 19' is specifically designated as a 13 kc. oscillator. It will be apparent that with the arrangement shown in Fig. 14 a response is produced in the wave signal receiver 10 which is a signal of 13 kc. modulated with a 40-cycle modulation component. Since both a 13 kc. signal and a 40-cycle signal are substantially inaudible or in any event outside the reproduction range of most speakers of such receivers, it is unnecessary to make the intensity thereof in the receiver low. For the purpose of transmitting the response produced in the receiver 10 in Fig. 14 of the drawings to the recorder 24 the receiver attachment designated at 20' differs from the receiver attachment 20 described heretofore only in that a band pass filter designated at 21' is provided capable of passing only signals having frequencies of the order of 40 cycles. In the central station 13 the 6 kc. filter 25, the amplifier 26, and the rectifier 27 are omitted and instead the 40-cycle band pass filter 122, the amplifier 123 and rectifier 124 are provided connected in that order between the house wiring circuit 17 and the recorder 24. The output of the rectifier 124 causes operation of the recorder 24 in exactly the same manner as was described in detail in connection with Figs. 11 and 13 of the drawings.

If desired a suitable filter such as the parallel resonant filter 139 may be connected between the tap 44a and the control electrode of the first audio tube 46 of the wave signal receiver 10 of Fig. 11 of the drawings as shown in Fig. 15 of the drawings. The corresponding parts of Fig. 15 are designated by the same reference numerals used in connection with Fig. 11. The filter 139 is designed to block the single component response such for example as the 6 kc. response from the speaker 12 whereby the intensity of the response is immaterial since it will not be reproduced in the loud speaker 12.

It will be understood from the above description that there has been provided an arrangement for recording the listening habits of wave signal receiver users or viewing habits in the case of television in which either a very simple or no connection with the metered or monitored wave signal receiver is necessary and furthermore the radio frequency circuits thereof are undisturbed. It should be understood that the term "listening habits" as used in the appended claims is intended to include "viewing habits" in the case of television receivers. The apparatus associated with the receiver is relatively sturdy apparatus which is so small that it can readily be disposed within the available space in very small wave signal receiver cabinets. By virtue of the composition of the search signal which is preferably produced remote from the receiver, a measurable but inaudible response is obtained clearly indicative of the pass band to which the monitored wave signal receiver is tuned. Although the apparatus disclosed and described is concerned with metering a single wave signal receiver, it will be understood that it is also capable of monitoring the receivers in a multi-receiver home.

It will be apparent to those skilled in the art that the present invention is not limited to the particular constructions and arrangements shown and described, but that changes and modifications may be made without departing from the spirit and scope of the present invention and it is aimed in the appended claims to cover all such changes and modifications.

What is claimed as new and desired to be secured by Letters Patent of the United States is:

1. In a device for determining the listening habits of users of a wave signal receiver capable of receiving at any time one of a plurality of carriers radiated from transmitters disposed within the reception range of said receiver comprising generating means for generating a search signal receivable by said receiver in addition to one of said radiated carriers including means for controlling said generating means to produce a search signal variable in frequency in a predetermined manner throughout a predetermined period of time, means for further modifying said search signal to so control the spectral composition thereof to produce a search tone in said receiver when detected therein at the instant during said period of time that the frequency of said search signal bears a predetermined relationship to the frequency of the pass band to which the receiver is tuned, and means linked to said receiver and responsive to the production of said search tone therein for producing an indication of the pass band to which said receiver is tuned.

2. In a device for determining the listening habits of users of a wave signal receiver capable of receiving at any time any one of a plurality of carriers radiated from transmitters disposed within the reception range of said receiver comprising means for cyclically generating a search signal receivable by said receiver in addition to one of said radiated carriers including means for controlling said first mentioned means to produce a search signal variable in frequency in a predetermined manner throughout each cycle, means for further modifying said search signal to so control the spectral composition thereof to produce a single component search tone in said receiver when detected therein at the instant during the search cycle that the frequency of said search signal bears a predetermined relationship to the frequency of the pass band to which said receiver is tuned., and means linked to said receiver and responsive to the production of said search tone therein for producing an indication of the pass band to which said receiver is tuned.

3. In a device for determining the listening habits of the users of a wave signal receiver capable of being tuned to any one of a plurality of radiated carriers from transmitters within the reception range of said receiver, a search signal generator for cyclically producing a radio frequency search signal variable in frequency in a predetermined manner during each cycle, means for transmitting said search signal so that it may be received by said wave signal receiver, means for controlling the composition of said variable frequency search signal to produce the same predetermined response in said receiver when detected by said receiver at the instant during the cycle of said search signal generator that the frequency of said search signal bears a predetermined relationship to the frequency of the channel tuned in by said wave signal receiver, means for maintaining the intensity of said response sufficiently low as to be inaudible, means linked to said receiver for recording said response with reference to the time of occurence thereof during said cycle thereby to be indicative of the particular channel tuned in by said receiver, and means for preventing the occurrence of an audible heterodyne note due to the intermodulation of said search signal and a radiated carrier simultaneously detected by said wave signal receiver.

4. In a device for determining the listening habits of users of a wave signal receiver capable of being tuned to any one of a plurality of radiated carriers from transmitters within the reception range of said receiver comprising means for generating a signal variable in frequency in a predetermined fashion throughout a predetermined frequency range which is within the frequency range of said receiver, means for causing said signal to sweep said predetermined frequency range in a cyclic fashion of the order of one cycle per minute, means for transmitting said search signal so as to be receivable by said receiver, means for modulating said search signal to produce the same distinctive response in said receiver at the instant during each cycle of said search signal that the frequency of said search signal bears a predetermined relationship to the frequency of the pass band tuned in by said receiver and regardless of the particular pass band tuned in by said receiver, and means linked to said receiver and responsive to the production of said distinctive response in said receiver for producing an indication of the pass band to which said receiver is tuned.

5. In a device for determining the listening habits of the users of a wave signal receiver capable of being tuned to any one of a plurality of radiated carriers from transmitters within the reception range of said receiver, a search signal generator for cyclically producing a search signal which scans or sweeps the frequency spectrum of said receiver in a predetermined manner during each cycle, means for transmitting said search signal so that it may be received by said wave signal receiver and detected therein, means for controlling said search signal to produce an inaudible response detection component when detected in said receiver at the instant during the cycle of said search signal generator that the frequency of said search signal bears a predetermined relationship to the transmitting frequency of a transmitter tuned in by said wave signal receiver, means linked to said receiver for recording said response with reference to the instant of occurrence in said receiver thereby to produce an indication of the particular transmitter tuned in by said receiver, and means for rendering non-disturbing the occurrence of an audible heterodyne note due to the intermodulation of said search signal and any radiated carrier simultaneously received by said wave signal receiver by causing said search signal to sweep said frequency spectrum with a speed far above the audible frequency range.

6. In a device for determining the listening habits of the users of a wave signal receiver capable of being tuned to any one of a plurality of radiated carriers from transmitters within the reception range of said receiver, a search signal generator for cyclically producing a search signal variable in frequency in a predetermined manner during each cycle, means for transmitting said search signal so that it may be received by said wave signal receiver and detected therein, means for controlling said search signal to produce a response detection component when detected in said receiver at the instant during the cycle of said search signal generator that the frequency of said search signal bears a predetermined relationship to the transmitting frequency of a transmitter tuned in by said wave signal receiver, means for maintaining the intensity of said response sufficiently low as to be inaudible, means linked to said receiver for recording said response with reference to the instant of occurrence in said receiver thereby to produce an indication of the particular transmitter tuned in by said receiver, and means for rendering non-disturbing the occurrence of an audible heterodyne note due to the intermodulation of said search signal and any one of said radiated carriers simultaneously received by said wave signal receiver by frequency modulating said search signal.

7. A device for recording the tuning condition of a wave signal receiver capable of being tuned to any one of a plurality of radiated carriers from transmitters disposed within the reception range of said receiver comprising, a search signal generator for cyclically producing a search signal variable in frequency in a predetermined manner during each cycle, means for transmitting said search signal so that it may be received by said wave signal receiver and detected therein, means for modulating said search signal with a random phase modulation to produce a response detection component when detected in said receiver at the instant during the cycle of said search signal generator that the frequency of said search signal bears a predetermined relationship to the transmitting frequency of a transmitter tuned in by said wave signal receiver, and means for maintaining the intensity of said response sufficiently low as to be inaudible, means linked to said receiver for recording said response with reference to the instant of occurrence thereof thereby to produce an indication of the particular transmitter tuned in by said receiver, said random phase modulation of said search signal preventing the occurrence of an audible heterodyne note due to the intermodulation of said search signal and any one of said radiated carriers simultaneously received by said wave signal receiver.

8. In combination with a wave signal receiver which is tunable over a predetermined frequency range to receive signals radiated by different transmitters operating at different frequencies within said range, an oscillator for generating a radio frequency search signal variable in frequency over at least a portion of said frequency range, means for transmitting said search signal to said receiver for reception thereby, means for modulating said search signal so as to produce the same predetermined response in said receiver when the frequency of said search signal falls within the pass band tuned in by said receiver and regardless of the particular one of said transmitters to which said receiver is tuned for signal reception, means linked to said receiver and responsive to the production of said predetermined response in said receiver for producing an indication of the one of said transmitters to which said receiver is tuned for signal reception, and means for controlling said search signal to prevent the production of a disturbing variable pitch heterodyne signal in said receiver when said search signal is received by said receiver concurrently with the signal radiated by one of said transmitters.

9. In a device for determining the listening habits of users of a wave signal receiver capable of being tuned to any one of a plurality of radiated carriers from transmitters disposed within the reception range of said receiver comprising means for generating a signal variable in frequency in a predetermined manner throughout a predetermined frequency range which is within the frequency range of said receiver, means for causing said signal to sweep said predetermined frequency range in a cyclic fashion of the order of one cycle per minute, means for transmitting said search signal so as to be receivable by said receiver, means for modulating said search signal to produce a response detection component when detected in said receiver at the instant during each cycle of said search signal that the frequency of said search signal bears a predetermined relationship to the frequency of the pass band tuned in by said receiver, and means linked to said receiver and responsive to the production of said response in said receiver for producing an indication of the pass band to which said receiver is tuned.

10. Apparatus for producing a record of the tuning condition of a wave signal receiver capable of being tuned to any one of a plurality of radiated carriers from transmitters disposed within the reception range of said receiver comprising means for cyclically generating a search signal receivable by said receiver, means for controlling said first mentioned means so that each cycle of said search signal comprises a signal variable in frequency in a predetermined manner, means for transmitting said search signal so as to be received by said receiver whereby said search signal is capable of producing a response when detected in said receiver in the form of a signal of a predetermined frequency in said receiver at the particular instant during the search cycle that the frequency of said search signal bears a predetermined relationship to the frequency of a pass band tuned in by said receiver, the occurrence of a response at a particular instant being indicative of the particular pass band to which said receiver is tuned, means at said receiver for filtering and amplifying said response, means for transmitting said response to a point remote from said receiver, and means at said remote point for further amplifying said response and recording the same with reference to time whereby a continuous record of the tuning condition of said receiver is obtained.

11. Apparatus for producing a record of the tuning condition of a wave signal receiver capable of being tuned to any one of a plurality of radiated carriers from transmitters disposed within the reception range of said receiver comprising, means for cyclically generating a search signal, means for controlling said first mentioned means so that each cycle of said search signal comprises a signal variable in frequency in a predetermined manner, means for modulating said search signal with a signal having a frequency of the order of 5 or 6 kc., means for transmitting the modulated search signal so as to be received by said receiver whereby a response in the form of a signal of the order of 5 or 6 kc. is produced in said receiver when detected therein at the particular instant during the search cycle that the frequency of said search signal bears a predetermined relationship to the pass band tuned in by said receiver, the occurrence of a response at a particular instant during the search signal cycle being indicative of the particular transmitting station to which said receiver is tuned, a receiver attachment including a microphone located adjacent said receiver for receiving said response and filtering and amplifying the same, a recording device, means for transmitting the amplified response to said recording device, and means at said recording device for further amplifying said response and recording the same with reference to time.

12. Apparatus for producing a record of the tuning condition of a wave signal receiver capable of being tuned to any of one of a plurality of radiated carriers from transmitters disposed within the reception range of said receiver comprising an oscillator for cyclically generating a search signal variable in frequency in a predetermined fashion throughout each cycle, means for transmitting said search signal so as to be receivable by said receiver, means for modulating said search signal to produce a response in said receiver when detected therein when the frequency of said search signal equals the radiated carrier of a transmitter tuned in by said receiver without producing a heterodyne note in said receiver, a receiver attachment capable of being disposed in the space available in the cabinet of said receiver and linked with the audio circuit of said receiver for filtering and amplifying said response, a recording device, means for transmitting said response from said receiver attachment to said recording device for recording by said recording device, and means for automatically controlling the intensity of said search signal in dependence upon the intensity of said response as received at said recording device.

13. A device for producing a record of the tuning condition of a wave signal receiver capable of being tuned to any one of a plurality of radiated carriers from transmitters disposed within the reception range of said receiver comprising an oscillator for generating a search signal variable in frequency in a predetermined fashion throughout a predetermined period of time, means for transmitting said search signal so as to be receivable by said receiver, means for modulating said search signal to produce a response in said receiver when detected therein when the frequency of said search signal falls within the pass band tuned in by said receiver, a receiver attachment disposed adjacent said receiver connected only with the audio circuit of said receiver for filtering and amplifying said response, a recording device, means for transmitting said response from said receiver attachment to said recording device, and means for automatically controlling the intensity of said search signal in dependence upon the intensity of said response as received at said recording device.

14. In a device for producing a record of the tuning condition of a wave signal receiver capable of being tuned to any one of a plurality of radiated carriers from transmitters disposed within the reception range of said receiver, means for cyclically generating a search signal variable in frequency in a predetermined fashion throughout each cycle, means for transmitting said search signal so as to be receivable by said receiver, means for modulating said search signal in a random phase manner with a signal in the audible frequency range of said receiver but near the upper limit of said range to produce a response in said receiver when detected therein when the frequency of said search signal falls within the pass band tuned in by said receiver without producing a heterodyne note in said receiver, a receiver attachment capable of being disposed adjacent said receiver for picking up said response and filtering and amplifying the same, a recording device, means for transmitting said response from said receiver attachment to said recording device and means for automatically controlling said search signal generator so that the response produced in said receiver may be maintained at the minimum intensity necessary for operating said last mentioned means.

15. In combination with a wave signal receiver which is tunable over a predetermined frequency range to receive signals radiated by different transmitters operating at different frequencies within said range, said receiver being provided with a tunable high frequency section into which signal energy received from any one of said transmitters is introduced, cyclically operable signal control means for altering the signal energy introduced into the high frequency section of said receiver during each operating cycle thereof, thereby to produce a measurable response in said receiver, and means linked to said receiver and responsive to the production of said measurable response in said receiver for producing an indication of the transmitting station to which said receiver is tuned for signal reception.

16. In combination with a wave signal receiver which is tunable over a predetermined frequency range to receive signals radiated by different transmitters operating at different frequencies within said range, said receiver being provided with a tunable high frequency section into which signal energy received from any one of said transmitters is introduced and also being provided with a low frequency section, cyclically operable signal control means operative to alter the signal energy introduced into the high frequency section of said receiver at different predetermined points in each operating cycle thereof which respectively correspond to said different transmitters, said altering of the signal energy introduced into the high frequency section of said receiver being effective to produce a measurable response in the low frequency section of said receiver, and means linked to said low frequency section of said receiver and jointly responsive to the production of said measurable response in said low frequency section of said receiver and to operation of said control means for producing an indication of the transmitting station to which said signal is tuned for signal reception.

17. In apparatus for determining the listening habits of users of a wave signal receiver capable of being tuned to any one of a plurality of radiated carriers from transmitters disposed within the reception range of said receiver, means for generating a radio frequency search signal variable in frequency in a predetermined fashion, means for transmitting said search signal so as to be receivable by said receiver, means for modulating said search signal so as to comprise a plurality of pulses of a radio frequency signal with the frequency of occurrence of said pulses being in the audible frequency range to produce a response in said receiver when detected therein when the frequency of said search signal falls within the pass band tuned in by said receiver, means for supplying a signal to the modulating signal having a frequency which is accurately maintained at a multiple of the frequency spacing of transmitting stations over the frequency spectrum, whereby there is produced a search signal in which the phase angle of the radio frequency signal in any pulse thereof bears a random phase relationship with respect to the phase angle of the radio frequency signal in any other pulse and no variable pitch heterodyne note is produced in said receiver by virtue of the intermodulation in said receiver of one of said radiated carriers with said search signal, and means linked to said receiver and responsive to the production of said response in said receiver for producing an indication of the pass band to which said receiver is tuned.

18. Apparatus for producing a record of the tuning condition of a wave signal receiver capable of being tuned to any one of a plurality of radiated carriers from transmitters disposed within the reception range of said receiver comprising means for cyclically generating a search signal, means for controlling said first mentioned means so that each cycle of said search signal comprises a signal variable in frequency in a predetermined manner, means for modulating said search signal with a signal in the audio frequency range capable of being substantially completely passed by a narrow pass band filter, means for controlling the modulation of said search signal to produce a signal incapable of producing a variable pitch heterodyne note when intermodulated with a signal of slightly different frequency, means for transmitting said modulated search signal so as to be received by said receiver, whereby a response in the audio frequency range is produced in said receiver when detected therein at the particular instant during the search cycle that the frequency of said search signal equals the frequency of the transmitter tuned in by said receiver, the instant of occurrence of said response with reference to the beginning of the search signal cycle being indicative of the particular transmitting station to which said receiver is tuned, means independent of said receiver for picking up said response upon its occurrence in said receiver, including a sharply tuned filter and an amplifier, a recorder including a control device, means for transmitting the amplified response from said last mentioned means to said recorder device, means at said recorder device for further amplifying and filtering said response, means for rectifying said response, and means for operating said control device from said rectified response.

19. In a device for determining the listening habits of users of a wave signal receiver capable of being tuned to any one of a plurality of radiated carriers from transmitters disposed within the reception range of said receiver comprising an oscillator for generating a radio frequency search signal variable in frequency in a predetermined fashion, means for transmitting said search signal so as to be receivable by said receiver, means for double modulating said search signal with a plurality of single frequency component signals of widely separated frequencies to produce a response in said receiver when detected therein of the frequency of one of said single frequency component signals modulated by another of said single frequency component signals when the frequency of said search signal falls within the pass band tuned in by said receiver, the double modulation of said search signal insuring against confusion of said response with some other signal receivable by said receiver, and means linked to said receiver and responsive to the production of said response in said receiver for producing an indication of the pass band to which said receiver is tuned.

20. A system for determining the frequency to which a tunable wave signal receiver is tuned for the reception of a desired radiated carrier, means for injecting into said receiver a signal variable in frequency with respect to time other than said desired carrier, means for providing said signal with a characteristic variable to produce the same distinctive response in said receiver when detected thereby regardless of the pass band to which said receiver is tuned, and means linked to said receiver and at least in part controlled by the response of said receiver to said signal for producing an effect representative of the radiated carrier to which said receiver is tuned to receive.

21. A system for determining the pass band to which a tunable wave signal receiver is tuned for the reception of a desired radiated carrier, means for injecting into said receiver a variable frequency signal other than said desired carrier, means for superimposing on said signal a modulation component capable of producing the same distinctive response in said receiver when the frequency of said signal falls within the pass band to which the receiver is tuned regardless of the particular pass band to which said receiver is tuned, and means linked to said receiver and controlled in accordance with the instant of occurrence of said distinctive response for producing an indication representative of the particular pass band to which said receiver is tuned.

22. An apparatus for determining the tuning condition of a tunable wave signal receiver for the reception of a desired radiated carrier, means located at a station remote from said receiver including means for producing a signal other than said carrier receivable by said receiver, said signal having a characteristic variable to produce the same distinctive response in said receiver when detected therein regardless of the tuning condition of said receiver, means for transmitting a signal representative of said response from said receiver to said station upon the occurrence of said response, and means at said station responsive jointly to the signal representative of said response and the instant of occurrence thereof for producing an indication of the tuning condition of said receiver.

23. A system for determining the frequency to which a tunable wave signal receiver is tuned for the reception of a desired radiated carrier, means for injecting into said receiver a modulated signal other than said desired carrier, the modulation component of said signal being capable of producing the same distinctive response in said receiver within the range of the audio circuits of said receiver regardless of the pass band to which said receiver is tuned, means linked to said receiver and jointly controlled by the response of said receiver to said signal and the instant of occurrence of said response for producing an effect representative of the tuning condition of said receiver, and filter means in the audio circuit of said receiver for preventing said response from being reproduced by the audio signal reproducer of said receiver.

24. A system for determining the pass band to which a tunable wave signal receiver is tuned for the reception of a desired radiated carrier, means for injecting into said receiver a variable frequency signal other than said desired carrier, means for modulating said signal prior to injection into said receiver with a modulation component capable of producing the same distinctive response in said receiver when the frequency of said signal falls within the pass band to which said receiver is tuned regardless of the particular pass band tuned in by said receiver, and means controlled jointly by the occurrence of said distinctive response and the instant of occurrence of said response for producing an indication representative of the particular pass band to which said receiver is tuned.

25. In a device for determining the frequency of the particular pass band to which a tunable wave signal receiver is tuned, means for generating and transmitting for reception by said receiver a radio frequency signal having a characteristic which will when detected by said receiver produce the same distinctive response in said receiver regardless of the pass band tuned in by said receiver, and means responsive to said distinctive response for producing an effect representative of the tuning condition of said receiver.

26. In a device for determining the frequency of the pass band to which a wave signal receiver is tuned, means for generating and transmitting a variable frequency radio frequency signal having a characteristic which will produce the same distinctive response when received by and detected in said receiver whether or not a radiated carrier is simultaneously received by said receiver and regardless of the pass band to which said receiver is tuned, and means responsive to said distinctive response and the frequency of said signal at the instant said response occurs for producing a record of the tuning condition of said receiver.

SERGE A. SCHERBATSKOY.

References Cited in the file of this patent

UNITED STATES PATENTS

| Number | Name | Date |
|---|---|---|
| 1,993,395 | Beers | Mar. 5, 1935 |
| 2,093,855 | Taylor | Sept. 21, 1937 |
| 2,112,446 | Pelmulder et al. | Mar. 29, 1938 |
| 2,131,558 | Granger | Sept. 27, 1938 |
| 2,188,165 | Thomas | Jan. 23, 1940 |
| 2,249,324 | Potter | July 15, 1941 |
| 2,270,899 | Roder | Jan. 27, 1942 |
| 2,275,460 | Page | Mar. 10, 1942 |
| 2,344,562 | Potter | Mar. 21, 1944 |
| 2,369,662 | Deloraine | Feb. 20, 1945 |
| 2,383,322 | Koch | Aug. 21, 1945 |
| 2,418,750 | Bliss et al. | Apr. 8, 1947 |
| 2,421,106 | Wight et al. | May 27, 1947 |